United States Patent [19]

Robinson, II

[11] Patent Number: 4,613,139
[45] Date of Patent: Sep. 23, 1986

[54] VIDEO CONTROL GLOVES

[76] Inventor: William H. Robinson, II, 3016 Sturtevant, Detroit, Mich. 48206

[21] Appl. No.: 679,989

[22] Filed: Dec. 10, 1984

[51] Int. Cl.[4] .............................................. A63F 9/22
[52] U.S. Cl. ...................... 273/148 B; 273/DIG. 28; 200/DIG. 2
[58] Field of Search .................. 273/148 B, DIG. 28; 200/DIG. 2, 6 A

[56] References Cited

U.S. PATENT DOCUMENTS 1,046,225  12/1912  Schindler ...................... 200/DIG. 2
4,246,452   1/1981  Chandler ..................... 273/148 B X
4,540,176   9/1985  Baer ................................ 273/148 B

FOREIGN PATENT DOCUMENTS

82/01345  4/1982  PCT Int'l Appl. .............. 273/148 B 1480243  7/1977  United Kingdom ......... 200/DIG. 2

Primary Examiner—Richard C. Pinkham
Assistant Examiner—Gary Jackson
Attorney, Agent, or Firm—Barnes, Kisselle, Raisch, Choate, Whittemore & Hulbert

[57] ABSTRACT

Apparatus for providing switch closure control inputs to a joystick control port of a video console comprising a pair of gloves having separate finger and thumb portions with electrical contacts mounted on the palm surfaces thereof adjacent to the finger and thumb tips. The electrical contacts are connected to selected terminals of a connector adapted for removable insertion into the console control port. Physical contact between the finger and thumb tips obtains electrical connection between associated contacts so as to provide switch closure control inputs to associated terminals of the control port.

2 Claims, 2 Drawing Figures

VIDEO CONTROL GLOVES

The present invention is directed to provision of signal inputs to the control port of a video console, and more particularly to apparatus for providing switch-closure control signal inputs to a joystick control port of a video game or computer.

An object of the present invention is to provide apparatus for furnishing input signals to the control port of a video console which is economical to fabricate, which may be readily repaired by the consumer, which is easy to use, which promotes manual dexterity in use, which finds particular advantage or application in use by handicapped persons, and/or which simulates or substitutes for a conventional joystick control device.

Figure 1:
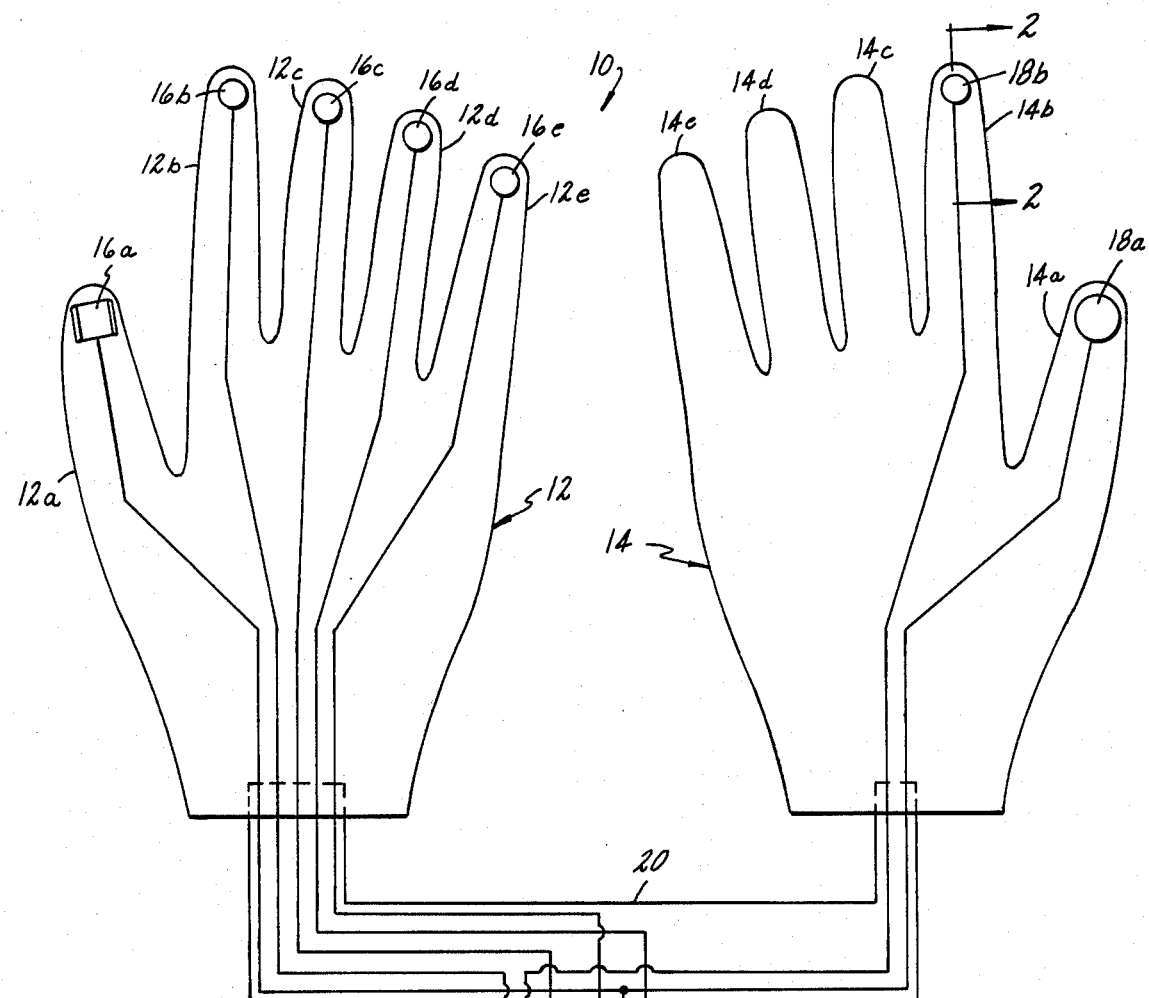
Figure 2:
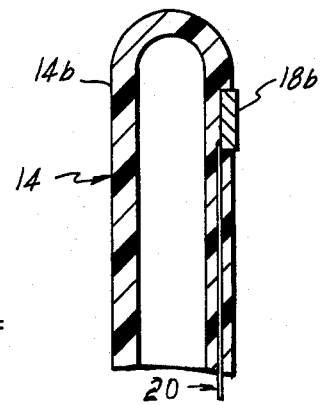

The invention, together with additional objects, features and advantages thereof, will be best understood from the following description, the appended claims and the accompanying drawing in which:

FIG. 1 is a schematic diagram of a presently preferred embodiment of the invention; and FIG. 2 is a fragmentary sectional view taken substantially along the line 2—2 in FIG. 1.

The drawings schematically illustrate a presently preferred embodiment 10 of control apparatus in accordance with the invention as comprising a pair of gloves 12,14 each having separate thumb and finger portions 12a–12e and 14a–14e adapted to be removably received onto the heads of a user or player. Contacts 16a–16e and 18a–18b of suitable electrically conductive material are respectively separately affixed to thumb and finger portions 12a–12e and 14a–14b on the inside or palm surface adjacent to the tips thereof. The surfaces of contacts 16a–16e and 18a–18b are exposed, such that physical contact between the finger and thumb tips obtains or results in electrical connection between the associated contacts.

Thumb and finger contacts 16a–16e and 18a–18b are connected by a cable 20 to an electrical connector 22. In a preferred embodiment of the invention illustrated in the drawings, connector 22 comprises a female type-DB9 nine pin joystick connector which is suitable for connection to a control port of a video game or computer console which adheres to or follows the so-called ATARI joystick convention. In such preferred embodiment, the contacts 16a,18a on the respective glove thumb portions 12a,14a are connected together through a current limiting (three hundred thirty-three ohm) resistor 24 to terminal eight of connector 22. Contacts 16b–16e, which provide directional control signal inputs to the control port, are respectively individually connected by cable 20 to terminals one, two, four and three of connector 22. Contact 18b on glove 14 is connected by cable 20 to terminal six of connector 22 to provide so-called "firebutton" control. In manufacture, gloves 12,14 may be of any suitable construction. Contacts 16a–16e and 18a–18b may be adhered or affixed by any suitable means to the finger and thumb tips as described. Where the gloves are of molded construction as shown in FIG. 2, the contacts may be molded therein at the time of manufacture, with the conductors of cable 20 likewise being molded into the glove skin. Cable 20 may be several feet in length.

In operation, with the gloves 12,14 fitted onto a user's hands and with connector 22 plugged into a video console joystick control port, selective connection of thumb contact 16a with one or more of the finger contacts 16b–16e provides an electrical switch closure control input to the control port so as to move the cursor or game figure about the screen or monitor in the usual manner. Thus, for example, abutment of contacts 16a and 16b will move the cursor or game figure upwardly on the screen, while abutment of contacts 16a and 16c will move the screen figure in the downward direction. To move the screen figure upwardly and to the right, thumb contact 16a is brought into physical and electrical contact with the two finger contacts 16b–16d. In this connection, it is preferable to make the thumb contact 16a of enlarged configuration, as shown in the drawing, so as to facilitate contact with two of the finger contacts 16b–16e. In the same way, physical and electrical contact of contacts 18a and 18b provides a "firebutton" switch closure input to the control port.

Although the invention has been described in detail in conjunction with a presently preferred embodiment thereof illustrated in the drawing, it will be apparent that many modifications and variations may be implemented without departing from the principles of the invention. For example, where only directional control is contemplated, only the glove 12 need be provided. In this connection, it may be desirable to provide an intermediate connector for selective removal of the "firebutton" glove 14, depending upon use. It is also contemplated in accordance with the invention that the gloves 12,14 may be made reversible by either providing pairs of contacts on each finger and thumb tip, or by using contacts which extend through the glove material. It is also contemplated that the direction and firebutton contacts may be distributed in a different manner among the glove fingers. In this connection, it will be appreciated that the term "finger" in the following claims is to be read in a generic sense to include the thumb, unless otherwise indicated. It is likewise contemplated that the principles of the present invention may be applied to other joystick-type control ports using a differing connector 22, for example, and/or using differing connection of the electrical contacts among the connector terminals.

The invention claimed is:

1. Apparatus for providing switch-closure control signal inputs to a joystick control port of a video console or the like, such control port being of predetermined configuration in which signal inputs consist of electrical closure between a common terminal at said port and one or more signal terminals, said apparatus comprising a first glove having a thumb portion and four finger portions separate from each other and from said thumb portion, a second glove having a thumb portion and at least one separate finger portion, electrical contact means affixed to each of said thumb and finger portions of said first glove adjacent to the tips thereof and to said thumb portion and said one finger portion of said second glove adjacent to the tips thereof, such that physical contact between a thumb portion of one of said gloves and one or more of said finger portions of the corresponding glove obtains electrical connection between the corresponding contacts on said portions, a connector constructed for removable mating engagement with a control port, said connector having common and signal terminals for individual mating engagement with common and signal terminals of a control port, first connection means individually electrically connecting said contacts on said finger portions of said first gloves to signal terminals of said connector, second connection means electrically connecting said contact on said thumb portion of said first glove to said common terminal at said connector, said second connection means including resistance means connected in series between said connector common terminal and said contact on said thumb portion, third connection means electrically connecting said contact means on said finger portion of said second glove to a signal terminal on said connector, and fourth connection means electrically connecting said contact on said thumb portion of said second glove to said resistance means such that said resistance means is connected in series between said connector common terminal and the contacts on the thumb portions of both said gloves.

2. The apparatus as set forth in claim 1 wherein said connector comprises a female type-DB9 nine pin connector, wherein said first connection means comprises means electrically connecting said contact means on the finger portions of said first glove associated with the first, second, third and fourth fingers of a user's hand to terminals one, two, four and three of said connector respectively, wherein said third connection means comprises means electrically connecting said contact on said finger portion of said second glove to terminal six of said connector, and wherein said second and fourth connection means comprises means individually connecting said contacts on said thumb portions of both said gloves through a resistor to terminal eight of said connector.

* * * * *

UNITED STATES PATENT AND TRADEMARK OFFICE
Certificate

Patent No. 4,613,139                                                                         Patented: September 23, 1986

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of the patent is: William Henry Robinson II, Redford, MI; William Frederick Robinson, Detroit, MI; and Rosa Mary Robinson, Detroit, MI.

Signed and Sealed this Sixth Day of March, 2001.

MICHAEL BUIZ
                                                                                                        *SPE*, Art Unit 3731